US007739260B1

(12) United States Patent
Anati et al.

(10) Patent No.: US 7,739,260 B1
(45) Date of Patent: Jun. 15, 2010

(54) DATABASE SEARCH SYSTEM USING INTERPOLATED DATA WITH DEFINED RESOLUTION

(75) Inventors: Eitan Anati, Timrat (IL); Harvey L. Kaylie, Brooklyn, NY (US)

(73) Assignee: Scientific Components Corporation, Brooklyn, NY (US)

( * ) Notice: Subject to any disclaimer, the term of this patent is extended or adjusted under 35 U.S.C. 154(b) by 838 days.

(21) Appl. No.: 11/648,238

(22) Filed: Dec. 28, 2006

(51) Int. Cl.
G06F 17/30 (2006.01)
(52) U.S. Cl. .................................... 707/706; 707/759
(58) Field of Classification Search .................. 707/3, 707/4
See application file for complete search history.

(56) References Cited

U.S. PATENT DOCUMENTS

| | | | |
|---|---|---|---|
| 5,257,355 A | 10/1993 | Akamatsu | |
| 5,278,980 A * | 1/1994 | Pedersen et al. | 707/4 |
| 5,942,956 A | 8/1999 | Haq | |
| 5,978,788 A * | 11/1999 | Castelli et al. | 707/2 |
| 6,016,487 A * | 1/2000 | Rioux et al. | 707/2 |
| 6,282,549 B1 * | 8/2001 | Hoffert et al. | 707/104.1 |
| 6,334,115 B1 | 12/2001 | Kuribayashi | |
| 6,366,904 B1 * | 4/2002 | BenHadda et al. | 707/3 |
| 6,374,260 B1 * | 4/2002 | Hoffert et al. | 707/104.1 |
| 6,401,006 B1 | 6/2002 | Mizuno | |
| 6,484,169 B1 | 11/2002 | Wilsford | |
| 6,615,166 B1 | 9/2003 | Guheen | |
| 6,704,024 B2 | 3/2004 | Robotham | |
| 6,745,181 B1 * | 6/2004 | Chang et al. | 707/4 |
| 6,769,009 B1 | 7/2004 | Reisman | |
| 6,983,236 B1 | 1/2006 | Karlovac | |
| 6,983,298 B2 | 1/2006 | Thakur | |
| 7,010,472 B1 | 3/2006 | Vasey-Glandon | |
| 7,016,811 B2 | 3/2006 | Peck | |
| 7,039,897 B2 | 5/2006 | Anderson | |
| 7,061,500 B1 | 6/2006 | Baldwin | |
| 7,065,625 B2 | 6/2006 | Alderson | |
| 7,069,095 B2 | 6/2006 | Nelson | |
| 2002/0015042 A1 | 2/2002 | Robotham | |
| 2003/0018633 A1 * | 1/2003 | Horn | 707/4 |
| 2004/0239681 A1 | 12/2004 | Robotham | |

(Continued)

OTHER PUBLICATIONS

Mini-Circuits, Yoni, The Design Engineers Search Engine User's Guide, 2001.
Mini-Circuits, Yoni, Various supporting documents.

*Primary Examiner*—Don Wong
*Assistant Examiner*—Kim T Nguyen
(74) *Attorney, Agent, or Firm*—Siegmar Silber

(57) ABSTRACT

A database search system is disclosed that interpolates between actual data points to achieve a defined level of data resolution while populating a database with a mixture of actual and interpolated data. Users of the database system enter search requests that include a range of values to search through for at least one parameter. This range of values is tested against the interpolation resolution value and if the user-specified range of search would result in a higher resolution than the interpolation resolution value, the user-specified range of search is adjusted to match the defined level of data resolution. The database is then searched, and the presence of interpolated data generally offers significant improvement to the number of appropriate items found and provided as output to the user as at least one of tabular, graphical or other displayed form.

15 Claims, 7 Drawing Sheets

U.S. PATENT DOCUMENTS

| | | | |
|---|---|---|---|
| 2004/0249809 A1* | 12/2004 | Ramani et al. | 707/4 |
| 2005/0108310 A1 | 5/2005 | Conrad | |
| 2005/0246403 A1 | 11/2005 | Lee | |
| 2006/0036422 A1 | 2/2006 | Gryba | |
| 2006/0167865 A1* | 7/2006 | Andrei | 707/4 |
| 2006/0200455 A1* | 9/2006 | Wilson | 707/4 |
| 2006/0242135 A1* | 10/2006 | Weare | 707/4 |
| 2006/0242137 A1* | 10/2006 | Shah et al. | 707/4 |

* cited by examiner

Click on the reference number to see Performance Data and Graph.

| Reference No. | Frequency MHz LO/RF | Frequency MHz IF | Conversion Loss dB Mid-Band | Conversion Loss dB Total Range | LO-RF Isolation dB L | LO-RF Isolation dB M | LO-RF Isolation dB U | LO-IF Isolation dB L | LO-IF Isolation dB M | LO-IF Isolation dB U | Case Style | Conn-ection | Notes | |
|---|---|---|---|---|---|---|---|---|---|---|---|---|---|---|
| ADE-1ASK | 2.00-600 | DC-600 | 6.5 | 7.5 | 45 | 30 | 25 | 40 | 24 | 18 | CD542 | ht | *,1,4 | Buy |
| ADE-2ASK | 1.000-1000 | DC-1000 | 6.8 | 9.5 | 45 | 30 | 20 | 40 | 22 | 12 | CD542 | ht | *,1,4 | Buy |
| ASK1-K491 | 1.000-600 | DC-600 | 7.0 | 8.5 | 30 | 25 | 20 | 35 | 20 | 15 | K491 | w | *,1,4 | Buy |
| TUF-1SM | 2.00-600 | DC-600 | 7.0 | 8.0 | 50 | 30 | 25 | 45 | 30 | 22 | NNN150 | z | *,1,4 | Buy |
| TUF-5LHSM | 20-1500 | DC-1000 | 8.5 | 9.0 | 40 | 30 | 25 | 25 | 18 | 8 | NNN150 | z | * | Buy |
| TUF-5SM | 20-1500 | DC-1000 | 9.0 | 9.0 | 40 | 30 | 25 | 25 | 18 | 8 | NNN150 | z | *,1,4 | Buy |

L=low range($f_L$ to $10f_L$)  M=mid range($10f_L$ to $f_U/2$)  U=upper range($f_U/2$ to $f_U$)

6 Items found

Frequency Mixers
LO Power Level: 7 dBm

Click on a 'Model Name' to view Performance Data and Graphs.

50 items found
Search Time: 0.48 s

New Search

| Model Name | Frequency [MHz] | | LO Power Level [dBm] | Conversion Loss [dB] | | | LO - RF Isolation typ. [dB] | | | LO - IF Isolation typ. [dB] | | | Case Style |
|---|---|---|---|---|---|---|---|---|---|---|---|---|---|
| | LO/RF | IF | | Mid-Band | Total Range | | L | M | U | L | M | U | |
| ADE-ED7879/1 | 0.40-953 | 0.20-520 | 7-13 | 5.7 | 8.1 | | | | | | | | QD542 |
| LRMS-ED6552/1 | 0.50-985 | 5-590 | 4-10 | 6 | 8 | | | | | | | | QQQ569 |
| ADE-ED7878/1 | 0.50-1050 | 0.20-1000 | 7-13 | | | | | | | | | | QD542 |
| ADE-ED6750/1 | 0.50-1058 | 0.50-900 | 4-10 | 5.5 | 8.2 | | | | | | | | QD542 |
| ASK-1-K81 | 1-600 | DC-600 | 4-10 | 7 | 8.5 | | 50 | 35 | 30 | 45 | 30 | 25 | K81 |
| ADE-ED7096/1 | 1-660 | DC-600 | 4-10 | 6 | 7 | | | | | | | | QD542 |
| LRMS-ED6047/1 | 1-675 | 1-510 | 4-10 | 6.8 | 9.5 | | 55 | 45 | 35 | 50 | 32 | 22 | 20 |
| ADE-2ASK | 1-1000 | DC-1000 | 4-10 | 7 | 9 | | 60 | 40 | 28 | 60 | 45 | 38 | NNN150 |
| TUF-5XSM | 1-1500 | 1-1000 | 4-10 | 8.5 | 9.8 | | 70 | 50 | 35 | 60 | 30 | 16 | TTT167 |
| SYM-2500 | 1-2500 | DC-500 | 4-10 | 6.5 | 7.5 | | 55 | 50 | 40 | 50 | 45 | 35 | QD542 |
| ADE-1ASK | 2-600 | DC-600 | 4-10 | 7 | 8 | | 60 | 42 | 37 | 60 | 47 | 36 | NNN150 |
| TUF-1SM | 2-600 | DC-600 | 7-13 | 7 | 8 | | 70 | 50 | 42 | 65 | 50 | 41 | NNN150 |
| TUF-1LHSM | 2-600 | DC-750 | 4-10 | 7.5 | 8.5 | | 70 | 45 | 38 | 60 | 40 | 30 | TT240 |
| RMS-1W | 2-750 | DC-750 | 4-10 | 7.5 | 8.5 | | 70 | 45 | 38 | 60 | 40 | 30 | QQQ569 |
| LRMS-1W | | | | | | | | | | | | | |

DATABASE SEARCH SYSTEM USING INTERPOLATED DATA WITH DEFINED RESOLUTION

BACKGROUND OF THE INVENTION

1. Field of the Invention

The present invention relates generally to database search systems that use data with defined and adjustable resolution. More specifically, the invention relates to online database search systems using a mixture of actual data and interpolated data where the selected resolution creates a uniform distribution of data so that adjacent data points are spaced at a distance not more than the defined resolution value. Further, this also controls the amount of interpolated data and, in turn, how finely the search inputs can be focused, the overall size of the database, and the speed and yield of the search.

2. Background of the Prior Art

Online (web-based) catalogs represent a large class of computer databases, and therewithin exists a significant subset, namely, those online catalogs containing parametric data. A further significant subset of parametric data catalogs include those having search capabilities, which searches are initiated when the user enters the selected parameters for a desired component. Such systems serve as an efficient instrumentality for aiding the specifying a particular component that is appropriate for use under specific performance conditions. Some systems of this type also allow the user to perform a limited range of performance simulations.

The majority of online catalogs are server-side systems, wherein any calculations or storing of data the is performed by the provider. In such systems, the catalog database frequently serves a large number of users at once. As the database may be very large, it is imperative that the system be designed to provide sufficient quality of data at a speed that the user will find acceptable.

The Mini-Circuits® Design Engineers Search Engine Yoni-1 catalog database system of Scientific Components Corporation, Brooklyn, N.Y. 11235 is an example of an existing online catalog search system containing a considerable body of parametric data for a large number of electronic components. Users are able to access the catalog through standard web browser software and search for specific components with input variables including frequency range and other electrical performance characteristics, as well as package type. The search output lists the components in the catalog that match the user's search request.

While type of system offers considerable benefit over simple tabular or graphical listings of devices and their relevant parameters, it is limited by the actual entered data. If actual data is not present for a particular range within a given parameter, it is entirely possible for the search to miss appropriate devices in the database. If there are a large number of devices and parameters, it is not feasible to have every conceivable data point entered into the database. Thus, as the number of devices and parameters increase, the amount of labor required to measure and enter sufficient data becomes a major challenge and an improvement to this type of catalog database system would include the ability to interpolate additional data points between actual data points. Then the database would be more completely populated with usable data and searches would yield more complete results.

Another prior art example in which a parametric database is limited by the extent of the existing data is the online catalog of a manufacturer of coil springs. Here the coil spring manufacturer requires the user to enter a variety of mechanical and dimensional parameters for a desired spring. Thereafter the database search output provides a listing of which springs in the catalog match the specified parameters. Unfortunately, the search system can only access each spring component according to the dimensional measurements by which it is generally described, these being in the relaxed or uncompressed state. So as the catalog lists 2" and 3" springs without intermediate data there is no facility for the search system to calculate how either of those springs might behave in a state of being stretched or compressed to 2.5." Thus, a user who specifies a 2.5" spring, and whose requirement could be accommodated by one of the 2" or 3" springs, cannot satisfy his requirement through use of the online catalog. If a suitable maximum of compression or extension were also included in the database, then would be possible to implement an interpolation to make data and thus catalog recommendations available to the user.

There are examples of prior art attempts to solve the problem of adequately providing data for large parametric databases. U.S. Pat. No. 7,069,095 entitled SYSTEM AND METHOD FOR POPULATING A COMPUTER-AIDED DESIGN PROGRAM'S DATABASE WITH DESIGN PARAMETERS teaches a system and method for assisting users in performing the tasks of entering parameters in a computer aided design (CAD) database, modifying parameters as needed, and then re-entering the modified parametric data into the database. However, while this system uses text editing and can use text find-and-replace operations to modify more than one item of parametric data at a time, the system only works with actual data and has no facility to fill in gaps in the actual data.

One strategy for addressing the challenge of filling gaps in actual data is taught by U.S. Pat. No. 7,039,897 entitled MODELING A TARGET SYSTEM BY INTERPOLATING. The system's methods of operation include responding to data inquiries by searching the database and if no actual data exists corresponding to the inquiry, interpolating an estimated value, storing the estimated value in the database, and returning the estimated value as a response to the inquiry. While this system provides the benefit of providing model data from an incompletely populated database, it is only generating and storing interpolated points on demand, and not controlling the resolution with which data inquiries may result in interpolated data being stored. This results in difficulty estimating the memory needs and projected query response time for such a system.

Another prior art method of enhancing a database through interpolation is taught by U.S. Pat. No. 6,704,024 and published applications US2002/0015042 and US2004/0239681, all entitled VISUAL CONTENT BROWSING USING RASTERIZED REPRESENTATIONS. The '024 patent discloses methods of displaying visual data using interpolation to assist in supporting variable image resolution. Depending on the method used, either the client or server computer system can interpolate between actual data points to increase the perceived resolution of displayed data. However, the interpolation methods taught here do not include any strategy for limiting resolution to prevent memory requirements from being impractical, which may particularly be an issue for client-side data manipulation methods. The interpolation taught here is also part of an on-demand method, rather than a method oriented towards long-term storage of the interpolated data along with the actual data.

SUMMARY

A more capable parametric database system would have the facility to interpolate between actual data points to further populate the database with interpolated data. Such a system would preferably also have a method of limiting data resolution to a desired level to prevent overuse of memory and processing resources, and a method of redefining the resolution defined by the user to be no greater than the set resolution programmed into the system.

OBJECTS AND FEATURES OF THE INVENTION

It is an object of the present invention to provide a parametric database search system that performs interpolation between actual data points to more completely populate the database with interpolated data points.

It is a further object of the present invention to provide storage for the actual and interpolated data points in a common database.

It is yet another object of the present invention to provide an internally set resolution limit thereby creating a uniform distribution of data so that adjacent data points are spaced at a distance not more than the defined resolution value and controlling the amount of memory and processing power needed to implement and search the database composed of actual and interpolated data It is still another object of the present invention to automatically redefine an overly high resolution search range input by a user into a search range matched to the maximum resolution set in the system.

It is a feature of the present invention that the system performs all processing on the server side of the network, thus providing a use experience generally independent of the client's hardware resources.

BRIEF DESCRIPTION OF THE DRAWINGS

The present version of the invention will be more fully understood with reference to the following Detailed Description in conjunction with the drawings of which:

FIG. 2 is a query output screen for a prior art electronic component selection database;

FIG. 4 is a query input screen for a database search system using interpolated data with defined resolution controlling the maximum resolution of the search inputs;

FIG. 5 is a query output screen for a database search system using interpolated data with defined resolution controlling the maximum resolution of the search inputs;

Figure 3:
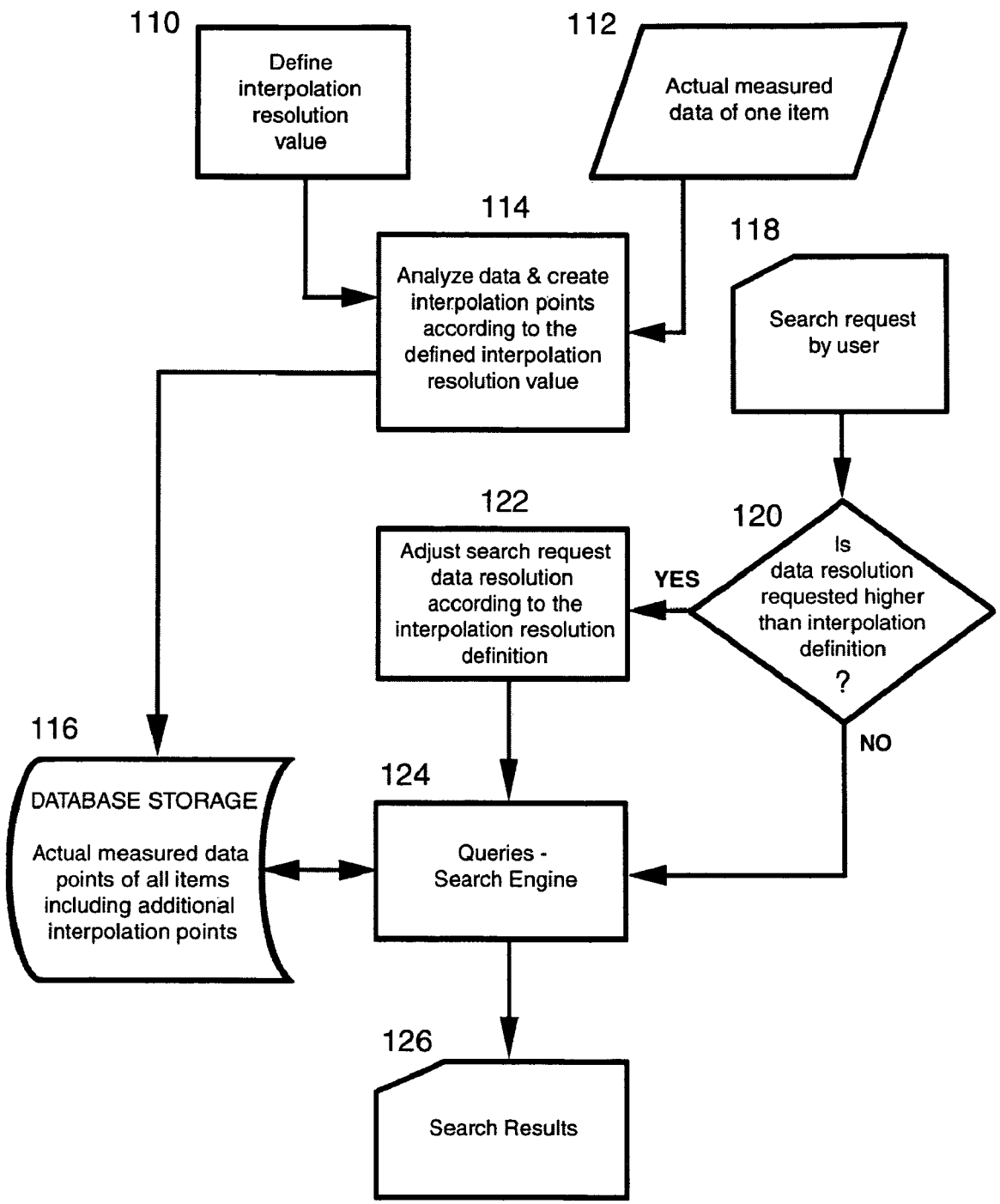
FIG. 3 is a flowchart of the operation of a database search system using interpolated data with defined resolution controlling the maximum resolution of the search inputs.
Figure 6:
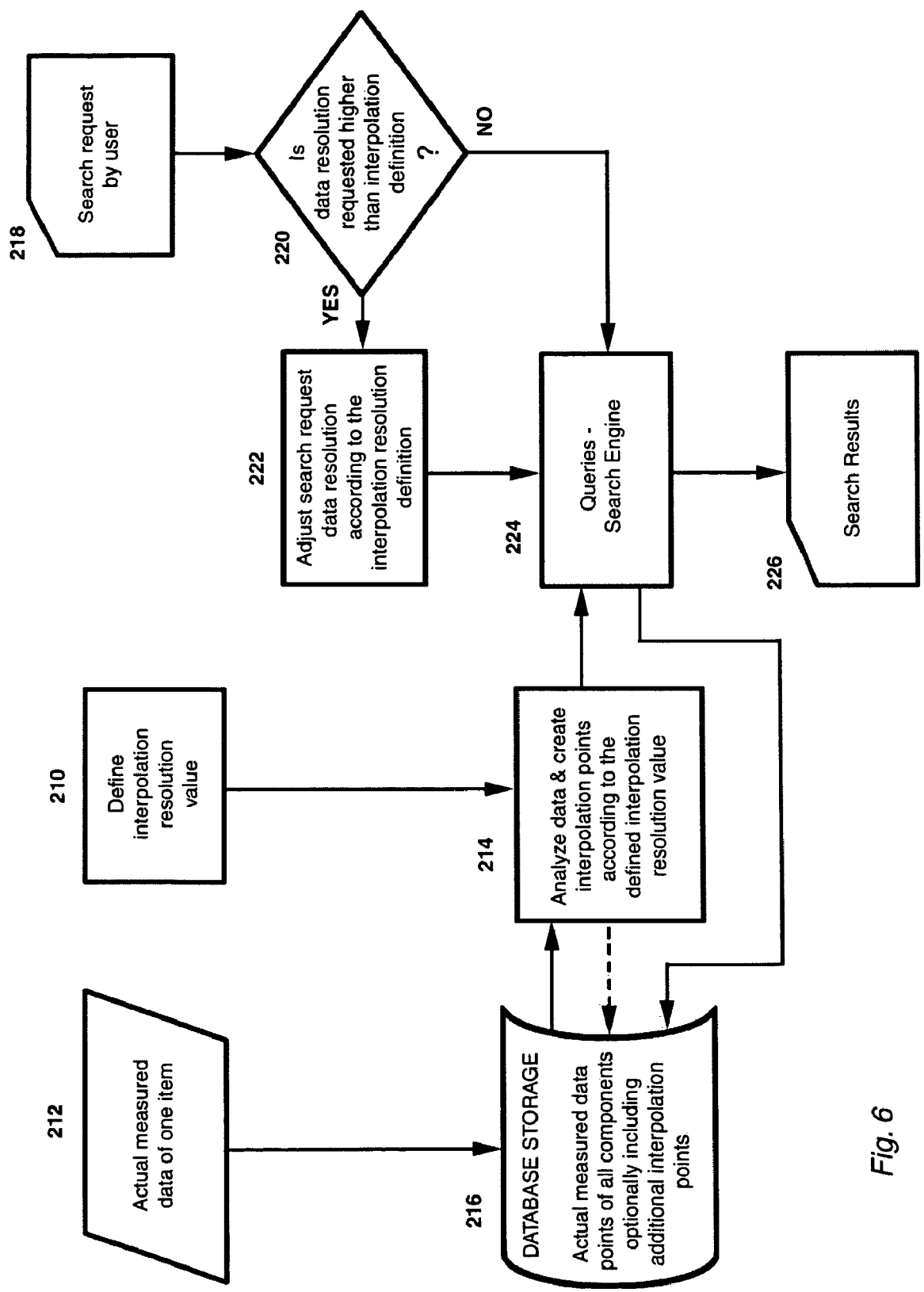
FIG. 6 is a flowchart of an alternate embodiment database search system using interpolated data with defined resolution controlling the maximum resolution of the search inputs, that calculates interpolated data only in response to a search input.
Figure 7:
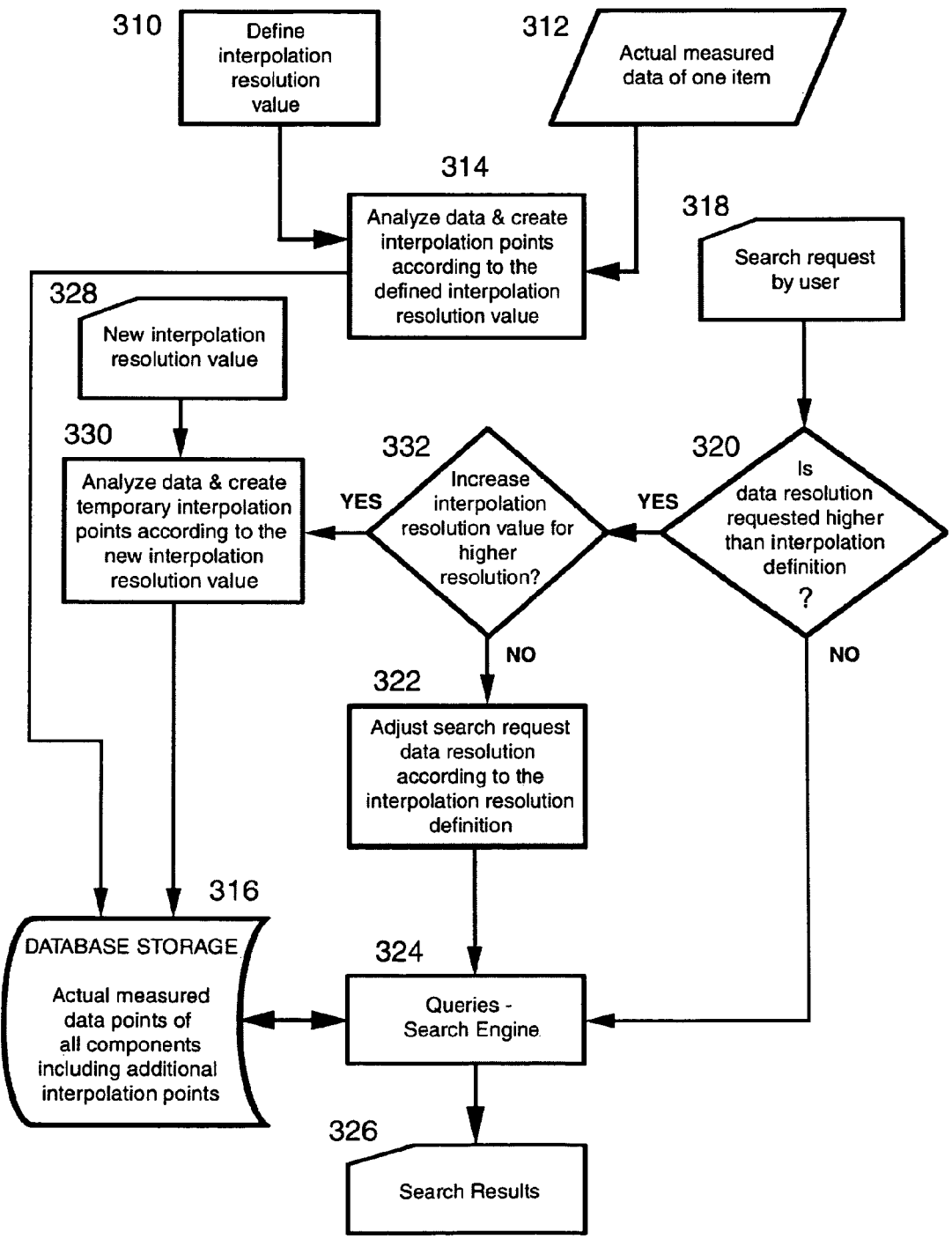
FIG. 7 is a flowchart of another alternate embodiment database search system using interpolated data with defined resolution controlling the default maximum resolution of the search inputs, but allowing the user the option of altering the interpolation resolution.

The functions for each of the FIGS. 3, 6 and 7 are generally similar from figure to figure by their functional module descriptions, and the reference designators for each figure are iterated by 100 to support this relationship. For example, DEFINE INTERPOLATION RESOLUTION VALUE in FIG. 3 is designated 110, DEFINE INTERPOLATION RESOLUTION VALUE in FIG. 6 is designated 210, DEFINE INTERPOLATION RESOLUTION VALUE in FIG. 7 is designated 310, and so forth.

DESCRIPTION OF THE PREFERRED
EMBODIMENT AND BEST MODE

The invention described herein is a system designed for searching for members of a class of items in a database, where the database contains parametric data associated with the items and interpolated data is added to the stored actual parametric data according to a defined resolution. The defined resolution represents the spacing between successive interpolated data points, and the defined maximum resolution represents the minimum allowable spacing between interpolated data points. The numerical coefficients of the defined resolution and defined maximum resolution are used in interpolation calculations within the system.

In the process of a user conducting a search, the search resolution may be expanded for a specific range of the parametric data up to the defined maximum resolution of the system. If the user-defined range of search is set to be smaller than the defined maximum resolution, the system will expand the range of search to match what is allowed by the defined maximum resolution.

A typical example of a use for the invention is in a database of radio and microwave frequency electronic components, where the database may contain thousands of components, with millions of actual data points, for hundreds of measurement parameters, and a user is searching for data about how a specific component will perform in a particular frequency range.

Figure 1:
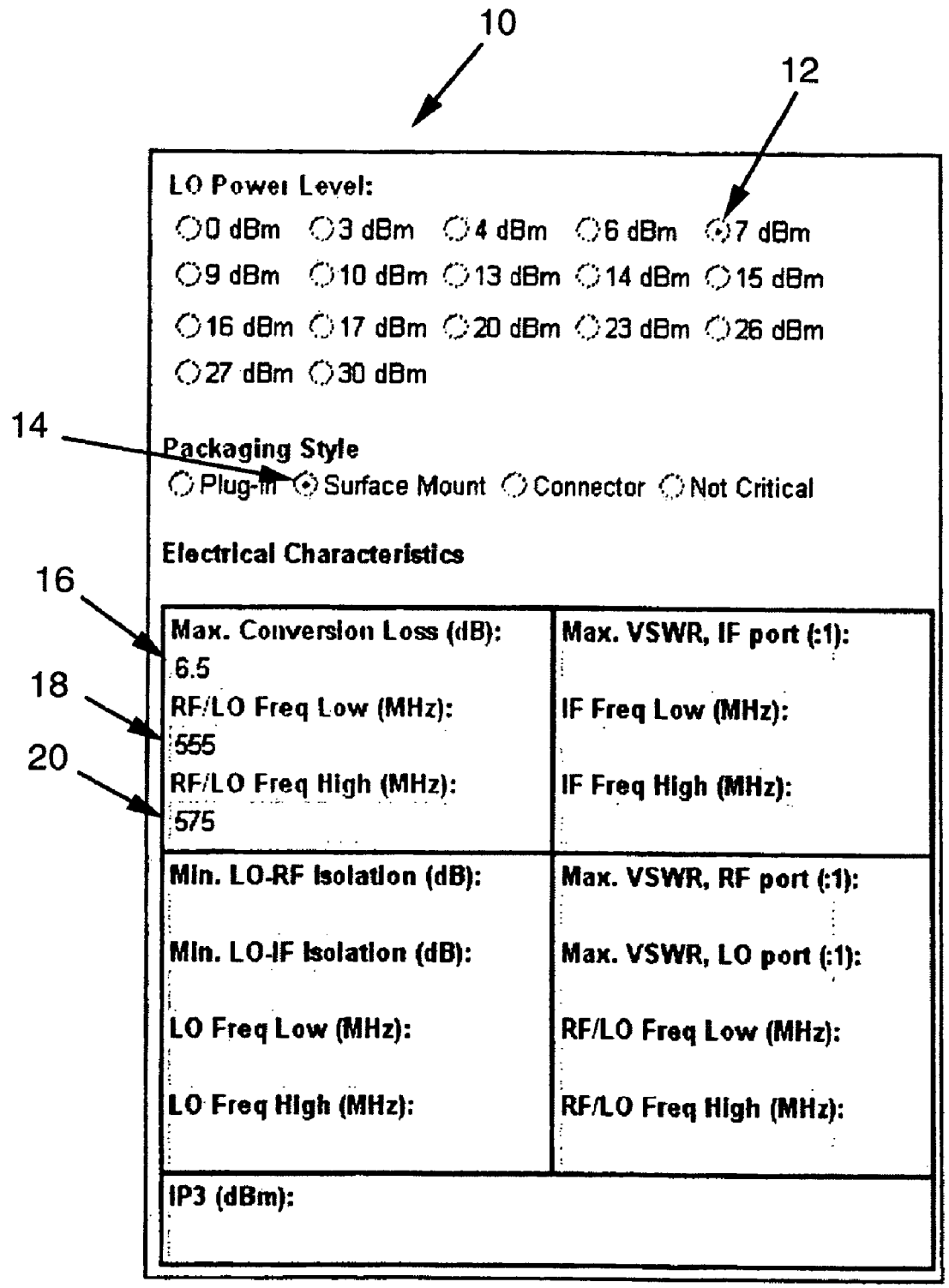
FIG. 1 is a query input screen for a prior art electronic component selection database.

FIG. 1 and FIG. 2 show respectively an input screen 10 and an output display 30 from a prior art user-searchable component database for a high frequency component known as a frequency mixer. The parameters selected are Power Level 12, Packaging Style 14, Max. Conversion Loss (dB) 16, Freq. Low (MHz) 18 and Freq. High (MHz) 20.

Referring to FIG. 3, the operation of the system is now described. DEFINE INTERPOLATION RESOLUTION VALUE module 110 sets how fine a resolution the system will interpolate to and thus contributes to controlling the potential size of the data to be stored in the database. The ACTUAL MEASURED DATA OF ONE ITEM module 112, together with the interpolation resolution value defined in module 110 is input to ANALYZE DATA AND CREATE INTERPOLATION POINTS ACCORDING TO THE DEFINED INTERPOLATION RESOLUTION VALUE module 114. The output of module 114 is entered into DATABASE STORAGE—ACTUAL MEASURED DATA POINTS OF ALL ITEMS INCLUDING ADDITIONAL INTERPOLATION POINTS module 116. This is the data accessed by queries from the search engine, QUERIES—SEARCH ENGINE module 124.

In operation, the user enters a search request through SEARCH REQUEST BY USER module 118. The search request is then tested to determine IS DATA RESOLUTION REQUESTED HIGHER THAN INTERPOLATION DEFINITION? module 120 and if YES, then ADJUST SEARCH REQUEST DATA RESOLUTION ACCORDING TO THE INTERPOLATION RESOLUTION DEFINITION module 122 is implemented. This prevents data sets and the interpolation processing from overwhelming the available memory and computational resources while still providing improved search capabilities to the user. If NO or once module 122 has been implemented if YES, QUERIES—SEARCH ENGINE module 124 is performed and SEARCH RESULTS module 126 are provided as output to the user.

A numerical example of this involves 10 (x,y) points, which might be shown in graphical as well as a typical tabular form:

X: 102, 203, 354, 505, 801, 1000, 1421, 1600, 1728, 1900
Y: 5.0, 5.3, 5.4, 5.5, 5.7, 5.9, 6.2, 6.3, 6.4, 6.5

If a user inputs a search request for data in the range of x=110 to x=200 and the system has a defined maximum resolution of 10, there will be 10 interpolated data points between each two actual data points and a typical data set for X may appear to be:

X: 102, 112, 122, 132, 142, 152, 162, 172, 182, 192, 202, 203, 213, . . . .

Using this linear interpolation technique, the points between x=110 to x=200 can now be analyzed and the resulting y values will be a function of the interpolated data.

If a user query involves a segment of the data that is at a higher resolution than the defined maximum resolution, for example a range of $x_1=188$ to $x_2=190$, since $x_1$ and $x_2$ fall between two points of actual or interpolated stored data, the system will adjust the search request data resolution by expanding the data range:

$$X_1=(x_1+x_2-\text{maximum resolution})/2$$

$$X_2=(x_1+x_2+\text{maximum resolution})/2$$

Thus, given the criteria listed here $X_1=184$ and $X_2=194$. The finer the maximum resolution is set, the more accurate the search results will be, but the larger the volume of data will be to store and the more arithmetic processing will be required.

More accurate data at the expense of more arithmetic processing may also be obtained by the use of different data interpolation algorithms for more accurate interpolation between actual data points, in some cases potentially including using multiple data interpolation algorithms depending on curve-fitting needs and appropriate scale of data. In this case, ANALYZE DATA AND CREATE INTERPOLATION POINTS ACCORDING TO THE DEFINED INTERPOLATION RESOLUTION VALUE module 114 would include at the least a more sophisticated interpolation algorithm than the general-purpose linear interpolation algorithm, or might include multiple interpolation algorithms selected for different classes of data, or multiple interpolation algorithms for use on different portions of a given data set.

To some limited extent, it may also be desirable for the invention to be able to function with search queries based on data points above or below the stored data set, rather than simply somewhere between the minimum and maximum stored values. In this case, an enhanced ANALYZE DATA AND CREATE INTERPOLATION POINTS ACCORDING TO THE DEFINED INTERPOLATION RESOLUTION VALUE module 114 or a dedicated extrapolative predictive module working as an alternative parallel data path would implement predictive data processing capabilities to stretch the value of the actual data beyond the measured range.

Figure 4:
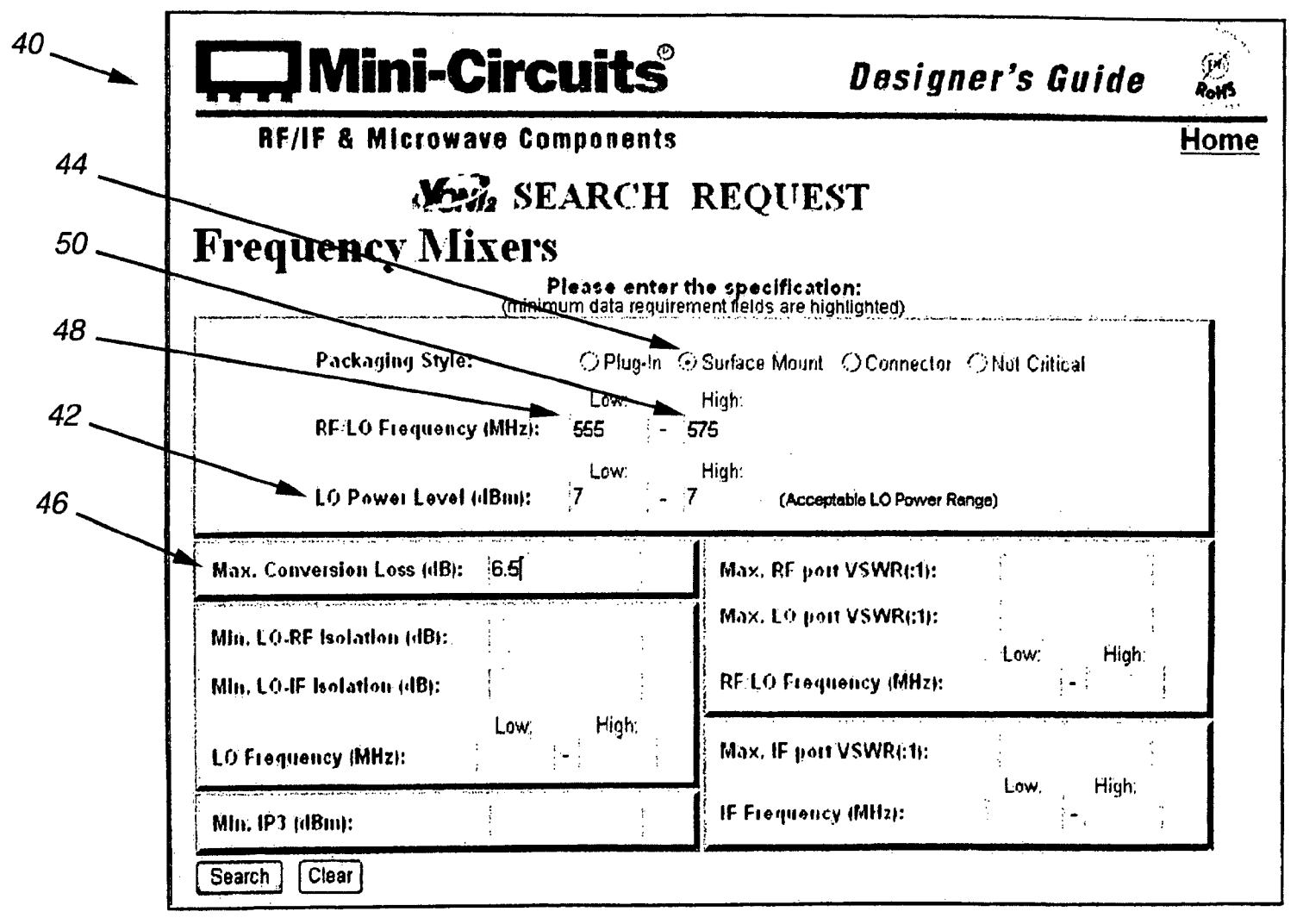

Query and results of a typical search in the same component database of FIG. 1 and FIG. 2 utilizing a data interpolation and defined resolution system are shown respectively in FIG. 4 and FIG. 5. This search starts with FIG. 4 showing an input screen 40 with the same search parameters selected as those shown in FIG. 1, Power Level 42, Packaging Style 44, Max. Conversion Loss (dB) 46, Freq. Low (MHz) 48 and Freq. High (MHz) 50.

FIG. 5 shows a search results display 60 indicating that 50 items were found by the search, rather than the 6 found in FIG. 2. Additionally, the displayed search time of 0.48 seconds would be acceptable in any manually implemented online search.

The operational methodology as described in FIG. 3 includes the steps of:
 (1) populating the database;
  a. defining an interpolation resolution value;
  b. entering actual parametric data into the database;
  c. analyzing the actual data and creating interpolation points according to the defined interpolation resolution value;
  d. storing the interpolated data in the database along with the actual data;
 (2) receiving a user search request;
 (3) determining whether the data resolution requested is higher than the defined interpolation resolution;
  a. if not, passing along the query to the search engine;
  b. if so, adjusting the search request data resolution according to the interpolation resolution definition and passing the modified query to the search engine;
 (4) performing the search of the database and returning the search results to the search engine; and
 (5) outputting the search results to the user.

FIG. 6 shows another embodiment of the invention that performs the data interpolation for each data set only at the time of each query, rather than during creation of the database.

The contents of the ACTUAL MEASURED DATA OF ONE ITEM module 212 is input to DATABASE STORAGE—ACTUAL MEASURED DATA POINTS OF ALL ITEMS OPTIONALLY INCLUDING ADDITIONAL INTERPOLATION POINTS module 216. In operation, the user enters a search request through SEARCH REQUEST BY USER module 218. The search request is then tested to determine IS DATA RESOLUTION REQUESTED HIGHER THAN INTERPOLATION DEFINITION? module 220 and if YES, then ADJUST SEARCH REQUEST DATA RESOLUTION ACCORDING TO THE INTERPOLATION RESOLUTION DEFINITION module 222 is implemented. This prevents data sets and the interpolation processing from overwhelming the available memory and computational resources while still providing improved search capabilities to the user.

If NO or once module 222 has been implemented if YES, QUERIES—SEARCH ENGINE module 224 communicates with DATABASE STORAGE—ACTUAL MEASURED DATA POINTS OF ALL ITEMS INCLUDING ADDITIONAL INTERPOLATION POINTS module 216. The requested stored actual data is passed from module 216 to ANALYZE DATA AND CREATE INTERPOLATION POINTS ACCORDING TO THE DEFINED INTERPOLATION RESOLUTION VALUE module 214. Module 214 uses input from DEFINE INTERPOLATION RESOLUTION VALUE module 210 to set how fine a resolution the system will interpolate to, calculates the interpolated data, and the output of module 214 comprising both actual and interpolated data is passed back to module 224, which in turn passes the data to SEARCH RESULTS module 126 where the data is provided as output to the user. Optionally, the interpolated data may also be passed from module 214 back to module 216 for permanent storage in the database along with the actual data.

The operational methodology as described in FIG. 6 includes the steps of:
 (1) populating the database by entering actual parametric data into the database;
 (2) receiving a user search request;

(3) determining whether the data resolution requested is higher than the defined interpolation resolution;
   a. if not, passing along the query to the search engine;
   b. if so, adjusting the search request data resolution according to the interpolation resolution definition and passing the modified query to the search engine;
(4) adding interpolated data;
   a. defining an interpolation resolution value;
   b. performing the search of the database and returning the search results to the interpolation module;
   c. analyzing the actual data and creating interpolation points according to the defined interpolation resolution value;
   d. optionally storing the interpolated data in the database along with the actual data;
   e. returning the search results to the search engine; and
(5) outputting the search results to the user.

FIG. 7 shows yet another embodiment of the invention that allows the user to adjust the interpolation resolution value in cases where the default parameters were not yielding satisfactory results.

DEFINE INTERPOLATION RESOLUTION VALUE module 310 sets how fine a resolution the system will interpolate to and thus contributes to controlling the potential size of the data to be stored in the database. The ACTUAL MEASURED DATA OF ONE ITEM module 312, together with the interpolation resolution value defined in module 310 is input to ANALYZE DATA AND CREATE INTERPOLATION POINTS ACCORDING TO THE DEFINED INTERPOLATION RESOLUTION VALUE module 314. The output of module 314 is entered into DATABASE STORAGE—ACTUAL MEASURED DATA POINTS OF ALL ITEMS INCLUDING ADDITIONAL INTERPOLATION POINTS module 316. This is the data accessed by queries from the search engine, QUERIES—SEARCH ENGINE module 324.

In operation, the user enters a search request through SEARCH REQUEST BY USER module 318. The search request is then tested to determine IS DATA RESOLUTION REQUESTED HIGHER THAN INTERPOLATION DEFINITION? module 320 and if YES, then the request is tested to determine INCREASE INTERPOLATION RESOLUTION VALUE FOR HIGHER RESOLUTION? module 332. If the result of module 332 is NO, then ADJUST SEARCH REQUEST DATA RESOLUTION ACCORDING TO THE INTERPOLATION RESOLUTION DEFINITION module 322 is implemented. This prevents data sets and the interpolation processing from overwhelming the available memory and computational resources while still providing improved search capabilities to the user.

If the result of module 320 is NO or once module 322 has been implemented, QUERIES—SEARCH ENGINE module 324 is performed and SEARCH RESULTS module 326 are provided as output to the user. If the results of both modules 320 and 332 are YES, then the user-specified interpolation resolution value in NEW INTERPOLATION RESOLUTION VALUE module 328 is input to ANALYZE DATA AND CREATE TEMPORARY INTERPOLATION POINTS ACCORDING TO THE NEW INTERPOLATION RESOLUTION VALUE module 330. The output of module 330 is entered into DATABASE STORAGE—ACTUAL MEASURED DATA POINTS OF ALL ITEMS INCLUDING ADDITIONAL INTERPOLATION POINTS module 316. This data is then accessed by queries from the search engine, QUERIES—SEARCH ENGINE module 324 and provided as output to the user through SEARCH RESULTS module 326.

The operational methodology as described in FIG. 7 includes the steps of:
(1) populating the database;
   a. defining an interpolation resolution value;
   b. entering actual parametric data into the database;
   c. analyzing the actual data and creating interpolation points according to the defined interpolation resolution value;
   d. storing the interpolated data in the database along with the actual data;
(2) receiving a user search request;
(3) determining whether the data resolution requested is higher than the defined interpolation resolution;
   a. if not, passing along the query to the search engine;
   b. if so, determining whether to increase interpolation resolution value for higher resolution;
      i. if not, adjusting the search request data resolution according to the interpolation resolution definition and passing the modified query to the search engine;
      ii. if so, entering a new interpolation resolution value;
      iii. analyzing the existing actual and interpolated data and creating temporary interpolation points according to the new interpolation resolution value;
(4) performing the search of the database and returning the search results to the search engine; and
(5) outputting the search results to the user.

Having described herein illustrative embodiments and best mode of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A database search system comprising:
a database configured for organized storage in a memory and retrieval of data from a memory;
a search engine in communication with said database;
an interpolation resolution value;
a data entry module for entering actual parametric data into said database;
a data analysis and interpolation module in communication with said data entry module and said database, said data entry and interpolation module configured for analyzing said actual parametric data, creating interpolated parametric data according to said interpolation resolution value, and entering said interpolated parametric data into said database;
a search query entry module;
a data resolution comparison module in communication with said search query entry module, said data resolution comparison module configured for determining whether said search query has a resolution greater than said interpolation resolution value;
a data resolution adjustment module in communication with said data resolution comparison module and said search engine, said data resolution adjustment module configured for adjusting the resolution of said search query to match said interpolation resolution value if said search query has a resolution greater than said interpolation resolution value;

said search engine configured to accept said search query and search said database; and an output module in communication with said search engine, said output module configured for outputting said data as search results.

2. A database search system as described in claim 1, wherein at least a portion of said interpolated parametric data is created in response to said search query entry.

3. A database search system as described in claim 2, wherein at least a portion of said interpolated parametric data is stored only for the duration of said search query.

4. A database search system as described in claim 2, wherein said interpolation resolution value may be adjusted for at least a limited numerical range by the user performing the search.

5. A database search system as described in claim 4, wherein at least a portion of said interpolated parametric data is stored only for the duration of the search query.

6. A database search system as described in claim 5, wherein multiple data interpolation algorithms are used based on an automated analysis of curve-fitting needs and automated scaling of data.

7. A database search system as described in claim 5, wherein at least one predictive data processing algorithm is used to extrapolate data values beyond the bounds of the actual data set.

8. A database search system for parametric component data comprising:

a database configured for organized storage in a memory and retrieval of parametric component data from a memory, a search engine in communication with said database; said database further configured for organized storage and retrieval of a class of items consisting at least of descriptions of the components for which the parametric data is stored;

an interpolation resolution value;

a data entry module for entering actual parametric component data into said database;

a data analysis and interpolation module in communication with said data entry module and said database, said data analysis and interpolation module configured for analyzing said parametric component data, creating interpolated parametric component data according to said interpolation resolution value, and entering said interpolated parametric component data into said database;

a search query entry module;

a data resolution comparison module in communication with said search query entry module, said data resolution comparison module configured for determining whether said search query has a resolution greater than said interpolation resolution value;

a data resolution adjustment module in communication with said data resolution comparison module and said search engine, said data resolution adjustment module configured for adjusting the resolution of said search query to match said interpolation resolution value if said search query has a resolution greater than said interpolation resolution value;

said search engine configured to accept said search query and search said database; and an output module in communication with said search engine, said output module configured for outputting as search results data from the group consisting of descriptions of the components, tabulated parametric component data and graphically displayed parametric component data.

9. A database search system for parametric component data as described in claim 8, wherein at least a portion of said interpolated parametric component data is created in response to said search query entry.

10. A database search system for parametric component data as described in claim 9, wherein at least a portion of said interpolated parametric component data is stored only for the duration of said search query.

11. A database search system for parametric component data as described in claim 9, wherein said interpolation resolution value may be adjusted for at least a limited numerical range by the user performing the search.

12. A database search system for parametric component data as described in claim 11, wherein at least a portion of said interpolated parametric component data is stored only for the duration of the search query.

13. A database search system for parametric component data as described in claim 8, wherein at least one data interpolation algorithm other than a generally linear interpolation algorithm is used.

14. A database search system for parametric component data as described in claim 13, wherein multiple data interpolation algorithms are used based on an automated analysis of curve-fitting needs and automated scaling of data.

15. A database search system for parametric component data as described in claim 13, wherein at least one predictive data processing algorithm is used to extrapolate data values beyond the bounds of the actual data set.

* * * * *